United States Patent
Bitton (10) Patent No.: US 9,655,205 B2
(45) Date of Patent: May 16, 2017

(54) METHOD AND SYSTEM FOR CALCULATING AMBIENT LIGHT

(71) Applicant: POINTGRAB LTD., Hod Hasharon (IL)

(72) Inventor: David Bitton, Tel-Aviv (IL)

(73) Assignee: POINTGRAB LTD., Hod Hasharon (IL)

( * ) Notice: Subject to any disclaimer, the term of this patent is extended or adjusted under 35 U.S.C. 154(b) by 0 days.

(21) Appl. No.: 15/045,330

(22) Filed: Feb. 17, 2016

(65) Prior Publication Data

US 2016/0239721 A1    Aug. 18, 2016

Related U.S. Application Data

(60) Provisional application No. 62/116,944, filed on Feb. 17, 2015.

(51) Int. Cl.
| | |
|---|---|
| *G01J 1/42* | (2006.01) |
| *H05B 37/02* | (2006.01) |
| *G06T 7/40* | (2017.01) |
| *G06T 7/00* | (2017.01) |

(52) U.S. Cl.
CPC ........ *H05B 37/0218* (2013.01); *G01J 1/4204* (2013.01); *G01J 1/4228* (2013.01); *G06T 7/40* (2013.01)

(58) Field of Classification Search
CPC ............. G06K 9/4661; G06K 9/00624; G06K 9/4604; H05B 37/0218
USPC ......................................................... 315/158
See application file for complete search history.

(56) References Cited

U.S. PATENT DOCUMENTS

| | | | |
|---|---|---|---|
| 8,100,552 B2 | 1/2012 | Spero | |
| 2013/0100097 A1* | 4/2013 | Martin | G01J 1/4204 345/207 |
| 2013/0229112 A1 | 9/2013 | Van Der Werff | |
| 2014/0035807 A1 | 2/2014 | Hsin-Chu | |
| 2014/0263951 A1* | 9/2014 | Fan | H04N 5/378 250/208.1 |
| 2015/0023775 A1* | 1/2015 | Bonefas | A01D 43/087 414/813 |
| 2015/0248872 A1* | 9/2015 | Fleureau | H05B 37/029 345/595 |
| 2015/0264241 A1* | 9/2015 | Kleekajai | H04N 5/2351 348/227.1 |
| 2015/0264278 A1* | 9/2015 | Kleekajai | H04N 5/2351 348/227.1 |

OTHER PUBLICATIONS

Sarkar et al. Integrated Daylight Harvesting and Occupancy Detection Using Digital Imaging, SPIE-IS&T/ vol. 6816, 2008.

* cited by examiner

*Primary Examiner* — Dylan White
(74) *Attorney, Agent, or Firm* — Daniel J. Swirsky; AlphaPatent Associates Ltd.

(57) ABSTRACT

Methods and systems according to embodiments of the invention calculate ambient light in a space, where the method includes obtaining an image of the space from an array of pixels, defining a plurality of pixel groups in the image, calculating a representative pixel value for each of the pixel groups, and calculating ambient light in the space based on the pixels in the image, disregarding pixels from the pixel groups having the highest and lowest representative pixel values.

19 Claims, 11 Drawing Sheets

METHOD AND SYSTEM FOR CALCULATING AMBIENT LIGHT

CROSS-REFERENCE TO RELATED APPLICATIONS

This application claims priority from U.S. Provisional Patent Application No. 62/116,944, filed Feb. 17, 2015, the contents of which are incorporated herein by reference in their entirety.

FIELD OF THE INVENTION

The invention relates to the field of light sensing. Specifically, the invention relates to automatic sensing of ambient light in a space based on image data of the space.

BACKGROUND

Building efficiency and energy conservation is becoming increasingly important in our society.

20 to 50 percent of total energy consumed in homes and offices are used for lighting. One way to conserve energy is to regulate illumination devices in a controlled space per need.

Occupancy sensing is sometimes used to control illumination devices according to need; powering an illumination device when a space is occupied and powering off the illumination device when the occupants leave the space. Ambient light sensors are also used to detect the amount of light available in a space to help a processor determine the amount of backlight or illumination needed.

Ambient light sensors for homes or buildings may typically include a photodiode or other photodetector to measure how much light is shining on it; the more light shining on the sensor, the higher the signal it sends out. However, typical light sensors lack spatial information and provide only a rough estimation of ambient light in the whole space.

Thus, improved methods, systems, and apparatuses are needed for better, more accurate ambient light sensing, which will enable to provide the most convenient lighting conditions at all times in living and work spaces.

SUMMARY

Methods and systems according to embodiments of the invention provide ambient light sensing utilizing an image sensor having an array of pixels to enable analyzing a scene to provide a more accurate map of the ambient light in a space, thereby enabling to provide the most convenient lighting conditions at all times in living and work spaces.

In one embodiment there is provided a method for calculating ambient light in a space. In one embodiment the method includes obtaining an image of the space from an array of pixels; detecting in the image non-representative pixels, based on a location of the pixels within the image; and calculating ambient light in the space based on the pixels in the image, while disregarding the non-representative pixels.

In one embodiment the method for calculating ambient light includes obtaining an image of the space from an array of pixels; detecting a parameter of a pixel or group of pixels; assigning a weight to a value of the pixel or group of pixels in the image based on the parameter of the pixel or group of pixels; and calculating ambient light in the space based on the weighted values of pixels in the image.

For example, the method may include giving a different (typically less) weight to non-representative pixels than to the other pixels in calculating the ambient light.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Methods and systems according to embodiments of the invention provide automatic sensing of ambient light in a space based on image data of the space. The image data is collected from an array of pixels which enables analyzing a scene to obtain an accurate map of the ambient light in a space.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
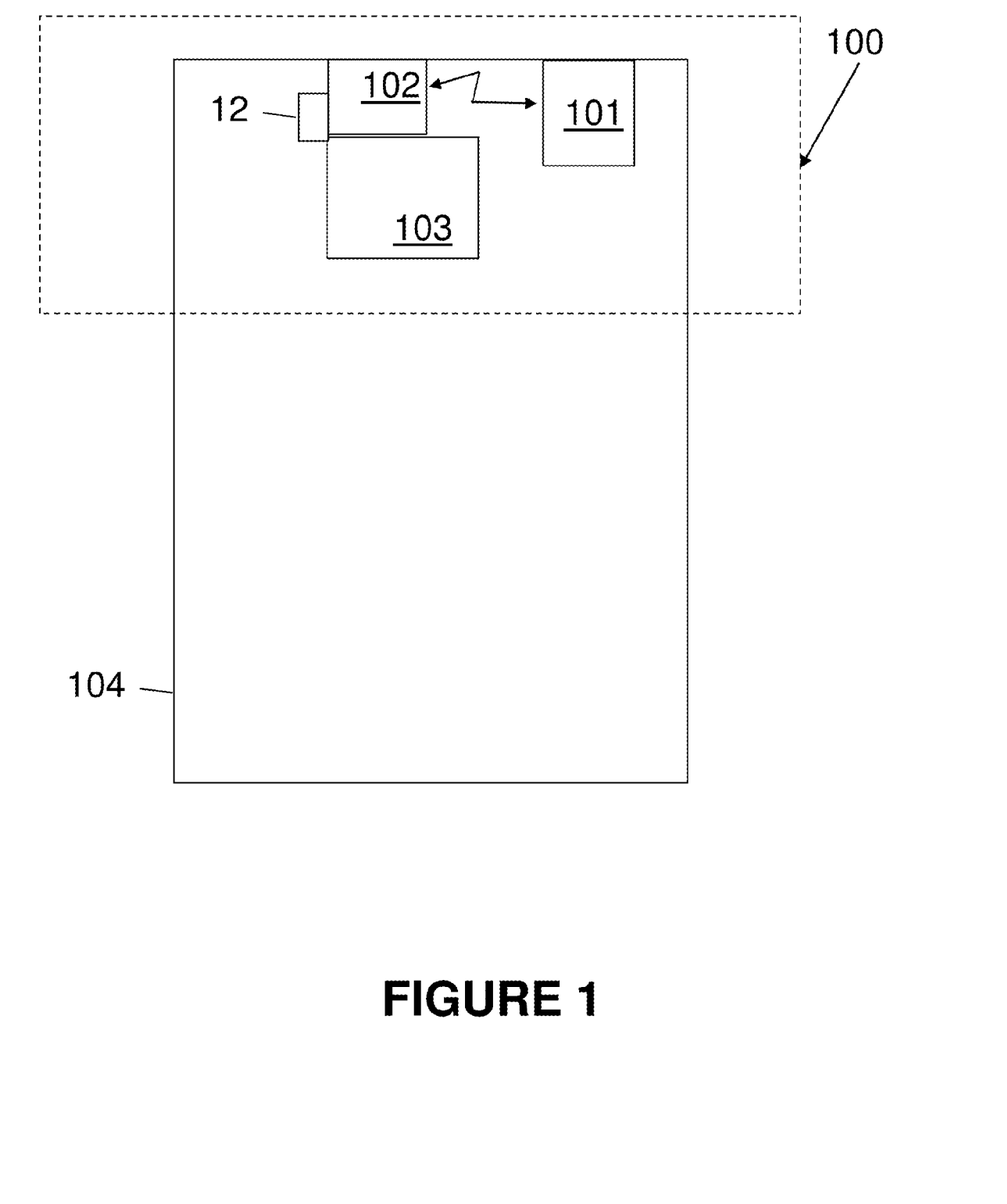
FIG. 1 is a schematic illustration of a system for calculating ambient light in a space, according to embodiments of the invention.

Methods according to embodiments of the invention may be implemented in a system for calculating ambient light in a space. A system according to one embodiment of the invention is schematically illustrated in FIG. 1.

In one embodiment the system 100 may include a multi-pixel sensor or a sensor having an array of pixels, such as image sensor 103 to obtain an image of a space, such as room 104. The image sensor 103 is typically associated with a processor 102 and a memory 12. In one embodiment the image sensor 103 is designed to obtain a top view of the room 104. For example, the image sensor 103 may be located on a ceiling of the room 104 to obtain a top view of the room 104.

Image data obtained by the image sensor 103 is analyzed by the processor 102. Processor 102 may analyze image brightness which is a known increasing function of the scene luminance. Thus, for non-saturated pixels the luminance of corresponding scene patches may be known. Other analysis may be done by processor 102. For example, image/video signal processing algorithms and/or image acquisition algorithms may be run by processor 102.

In one embodiment the processor 102, which is in communication with the image sensor 103, is to detect in the image of the space "non-representative pixels", based on a location of the pixels and to calculate ambient light in the space based on the pixels in the image while disregarding the non-representative pixels.

In one embodiment the processor 102 is to assign a weight to pixels, for example, based on parameters of the pixels and to calculate ambient light in the space based on the weighted values of the pixels in the image.

Non-representative pixels are typically pixels in the image of the space obtained by the image sensor 103, which represent areas of the image that do not contribute to the global illumination (the integrated (e.g., average) illumination level in a space) as it would be perceived by a human occupant in the space. An image sensor used for monitoring a space typically captures an image of the space from a different viewpoint than a human occupant in that same space. For example, if an image sensor is located in a space such that it obtains a top view of the space then the field of view of the image sensor includes the space from the top whereas the field of view of a human sitting or standing in the space includes the space from a right angle compared to the top view of the image sensor. Thus, in most cases, the image captured by an imaging device monitoring a space is different from the virtual image captured by a human occupant in that space. Objects within the space which may have an effect on the illumination level (e.g., as measured in Lux) in the space may be included in the image captured by the image sensor but not in the image perceived by the human occupant or vice versa. Objects which may have an effect on the illumination level in a space may include objects such as light sources or windows, or reflecting surfaces such as mirrors, white boards, walls, floor, etc.

Thus, pixels from areas in the image captured by image sensor 103 which do not overlap with areas from the image perceived by a human occupant in room 104 would typically not represent the illumination level in room 104 as perceived by a human occupant. These pixels could be considered non-representative pixels.

Additionally, pixels representing light sources, either primary light sources (sources of direct light, e.g. sunlight through a window, lamps, light bulbs, etc.) visible in the imaged space or secondary light sources (e.g., indirect sources of light such as light reflection from surfaces such as mirrors and floors), as opposed to the diffusive illumination coming from the scene objects and surfaces, may be considered non-representative pixels.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments image data may be stored in processor 102, for example in a cache memory. Processor 102 can apply image analysis algorithms, such as known shape detection algorithms or texture recognition algorithms in combination with methods according to embodiments of the invention to detect and identify an object.

In one embodiment the processor 102 is in communication with a device 101. The device 101 may be used to monitor a space the device 101 may include a processor to issue reports about the illumination levels in a space over time). The device 101 may be an alarm or another device involved in monitoring a space.

In some embodiments the device 101 is an illumination device or a controller of an illumination device. The device 101 may be part of a central control unit of a building, such as known building automation systems (BAS) (provided for example by Siemens, Honeywell, Johnson Controls, ABB, Schneider Electric and IBM) or houses (for example the Insteon™ Hub or the Staples Connect™ Hub).

According to one embodiment, the image sensor 103 and/or processor 102 are embedded within or otherwise affixed to device 101. In some embodiments the processor 102 may be integral to the image sensor 103 or may be a separate unit. According to other embodiments a first processor may be integrated within the image sensor and a second processor may be integrated within a device.

In some embodiments, processor 102 may be remotely located. For example, a processor according to embodiments of the invention may be part of another system (e.g., a processor mostly dedicated to a system's Wi-Fi system or to a thermostat of a system or to LED control of a system, etc.).

The communication between the image sensor 103 and processor 102 and/or between the processor 102 and the processing unit 101 may be through a wired connection (e.g., utilizing a USB or Ethernet port) or wireless link, such as through infrared (IR) communication, radio transmission, Bluetooth technology, ZigBee, Z-Wave and other suitable communication routes.

According to one embodiment the image sensor 103 may include a CCD or CMOS or other appropriate chip and appropriate optics. The image sensor 103 may include a standard 2D camera such as a webcam or other standard video capture device. A 3D camera or stereoscopic camera may also be used according to embodiments of the invention.

When discussed herein, a processor such as processor 102 which may carry out all or part of a method as discussed herein, may be configured to carry out the method by, for example, being associated with or connected to a memory such as memory 12 storing code or software which, when executed by the processor, carry out the method.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

Figure 2A:
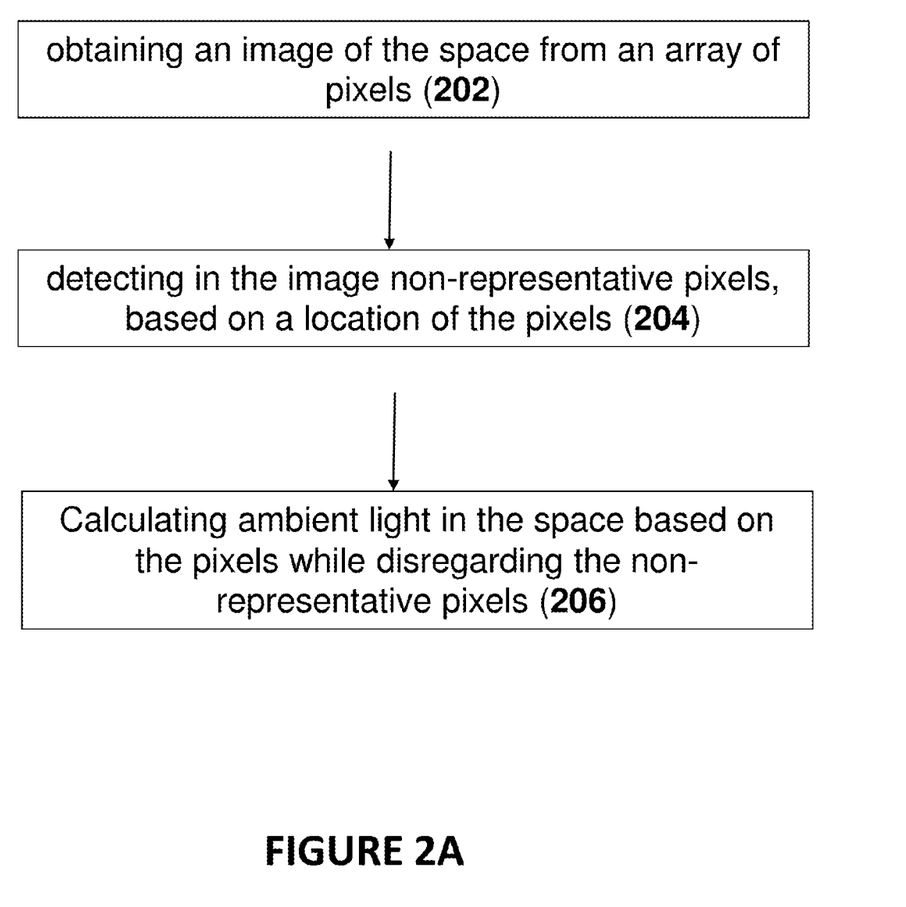
FIGS. 2A, 2B and 2C schematically illustrate methods for calculating ambient light in a space, according to embodiments of the invention.
Figure 2B:
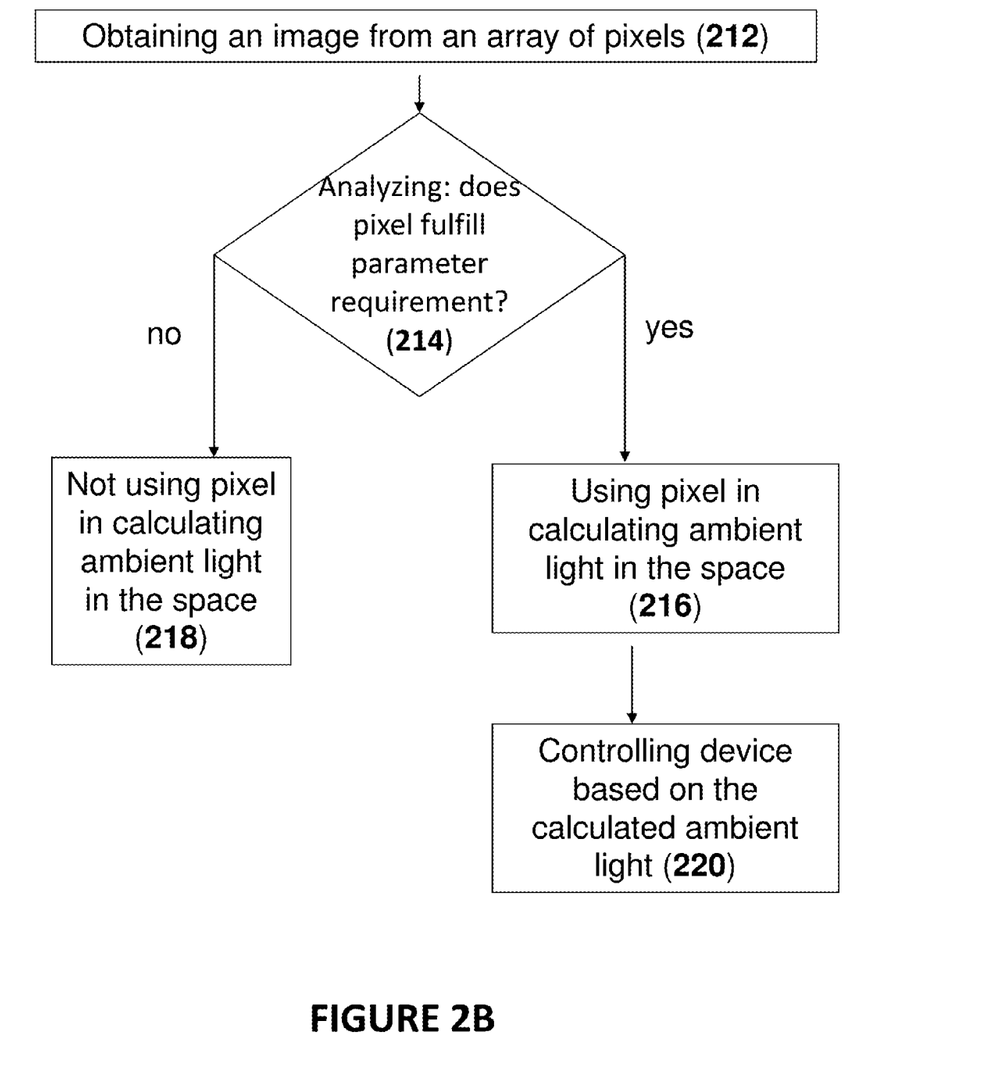
Figure 2C:
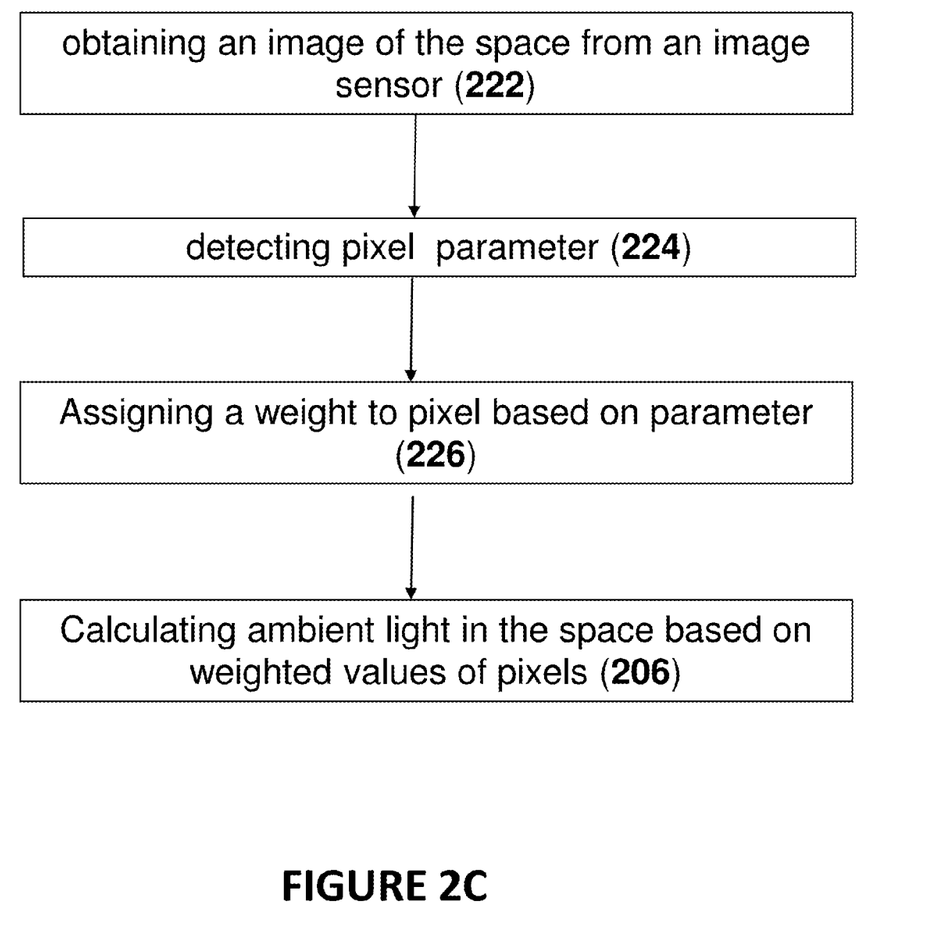

Methods for calculating ambient light in a space, according to embodiments of the invention are schematically illustrated in FIGS. 2A, 2B and 2C.

The embodiment schematically illustrated in FIG. 2A includes the steps of obtaining an image or image data of the space from an array of pixels (202) and detecting in the image non-representative pixels, based on a location of the pixels within the image or within the array (204). Ambient light in the space may then be calculated based on the pixels in the image while disregarding the non-representative pixels (206).

The method may further include outputting a signal indicative of the ambient light in the space (e.g., based on the calculated ambient light). The signal may be used to monitor the space or to control a device based on the ambient light in the space.

In the embodiment schematically illustrated in FIG. 2B an image or image data of the space is obtained from an image sensor (e.g., 103) having an array of pixels (212). Each pixel or group of pixels is analyzed for a parameter (214), the parameter typically including the location of the pixel (as further exemplified below). If the pixel or group of pixels fulfills a parameter requirement then the pixel, or group of pixels may be used in calculating ambient light in the space (216) (e.g., by using the pixels values or an appropriate calculation of the pixels values as an indication of luminance of the scenes depicted by the pixels).

If the pixel or group of pixels does not fulfill a parameter requirement then the pixel, or group of pixels are determined to be non-representative pixels and these pixels are not used in calculating ambient light in the space (218).

A device (e.g., 101) may be controlled based on the calculated ambient light (220). For example, controlling a device may include modulating light levels in the space based on the calculated ambient light.

In some embodiments disregarding the non-representative pixels includes assigning a weight to the non-representative pixels that is different than the weight assigned to other pixels in the image. Thus, it should be appreciated that according to embodiments of the invention all pixels of an image may be used to calculate ambient light in the space however the weight given to the value of each pixel or group of pixels may be determined by considerations detailed herein. For example, non-representative pixels may be given less weight than other pixels in calculating ambient light.

In the embodiment schematically illustrated in FIG. 2C an image or image data of the space is obtained from an image sensor (e.g., 103) having an array of pixels (222). Each pixel or group of pixels is analyzed for a parameter so that pixel (or group of pixels) parameters are detected (224). Pixels or groups of pixels are assigned a weight (226) based on the parameter of the pixel and ambient light in the space is calculated based on the weighted values of pixels in the image (228).

A parameter of a pixel may include the pixel value or the location of the pixel (as further exemplified below) or other parameters.

In one example, pixels of a pre-specified value range can be determined to be pixels related to a primary light source and as such may be assigned a low weight.

Figure 3:
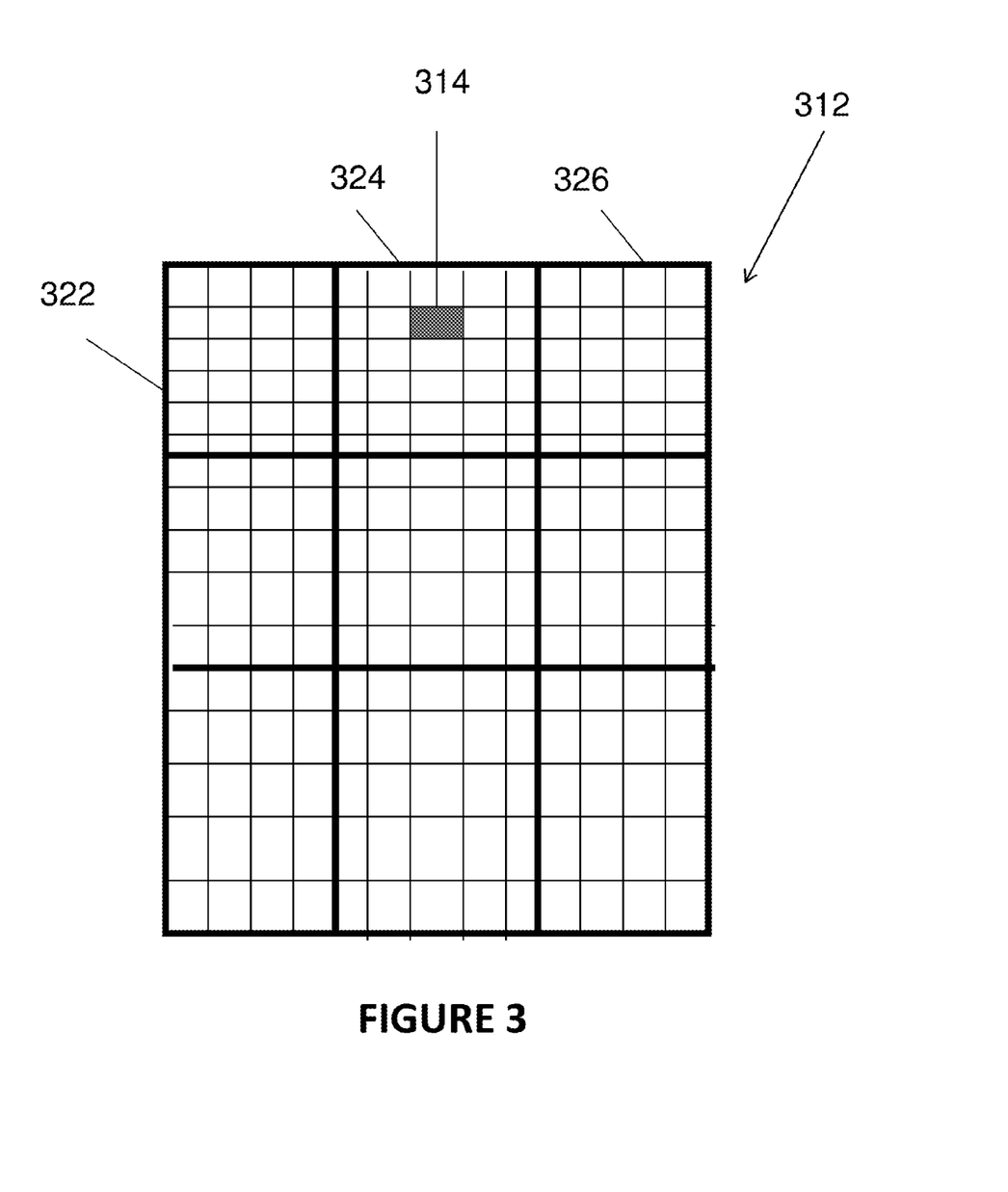
FIG. 3 schematically illustrates an image of a space according to embodiments of the invention.

In one embodiment which is schematically illustrated in FIG. 3, an image 312 of a space is obtained from an array of pixels. The image 312 is divided into groups of pixels, e.g., tiles 322, 324, 326 etc., each tile including a plurality of pixels. Typically, the tiles are equally sized tiles. For example, an image may be divided to 3×3 up to 15×15 equally sized tiles.

A value (or other parameter) of pixel 314 (or typically of the group of pixels) located in tile 324 may be determined and the pixel 314 or group of pixels may be assigned a weight based on the determined value. In this embodiment the tile 324 may be determined to be a representative or non-representative tile based on a calculation of the pixel values or weighted values.

Thus, a method according to one embodiment of the invention may include the steps of obtaining an image of the space from an array of pixels (e.g., image 312) and defining a plurality of pixel groups in the image (e.g., tiles 322, 324 and 326). A representative parameter for each of the pixel groups may be determined and a weight may be assigned to each representative parameter. Ambient light in the space may be calculated based on the weighted parameters.

A signal indicative of the calculated ambient light may be output. In one embodiment a device may be controlled based on the calculated ambient light. For example, light levels in the space may be modulated based on the calculated ambient light.

In one example the representative parameter may be a location of the group of pixels within the image (as further detailed hereinbelow). The location of the group of pixels in the image may be a pre-specified location within the image (as further detailed herein). For example, the method may include identifying an object (e.g., by detecting the objects shape or texture) in the image and the location is at a pre-specified location relative to the identified object. The object may be, for example, a reflecting surface, a primary light source or an occupant.

In some cases the representative parameter is a value of pixels in the group of pixels. In this case the method may include calculating a representative pixel value for each of the pixel groups; and assigning a low weight to the pixel groups having the highest and lowest representative pixel values. In some cases assigning a low weight may mean some pixels are disregarded when calculating ambient light according to embodiments of the invention, as further exemplified below.

In one embodiment a plurality of pixel groups (e.g., tiles 322, 324, 326) are defined in the image 312. A representative pixel value for each of the pixel groups may be calculated, for example, by computing or determining an average value of all the pixel values in a group, by computing or determining a median pixel value of each group or by applying other appropriate functions to obtain a representative value of the group of pixels. The ambient light in the space may then be calculated based on the pixels (e.g., 314) in the image 312 while disregarding pixels from the pixel groups having the highest and lowest representative pixel values. Thus, for example, if representative pixel values of each tile in image 312 are calculated and tile 322 has the lowest representative pixel value of all the tiles and tile 326 has the highest representative value, the ambient light in the space will be calculated using all the pixels of image 312 except the pixels in tile 322 and tile 326.

The highest and lowest values may each include one or more values. For example, the ambient light in the space may be calculated by using the median value of the pixels in image 312, thereby disregarding the highest and lowest values.

In another embodiment a parameter of a pixel may include a location of the pixel within the image and non-representative pixels may be pixels at a pre-specified location within the image.

Figure 4:
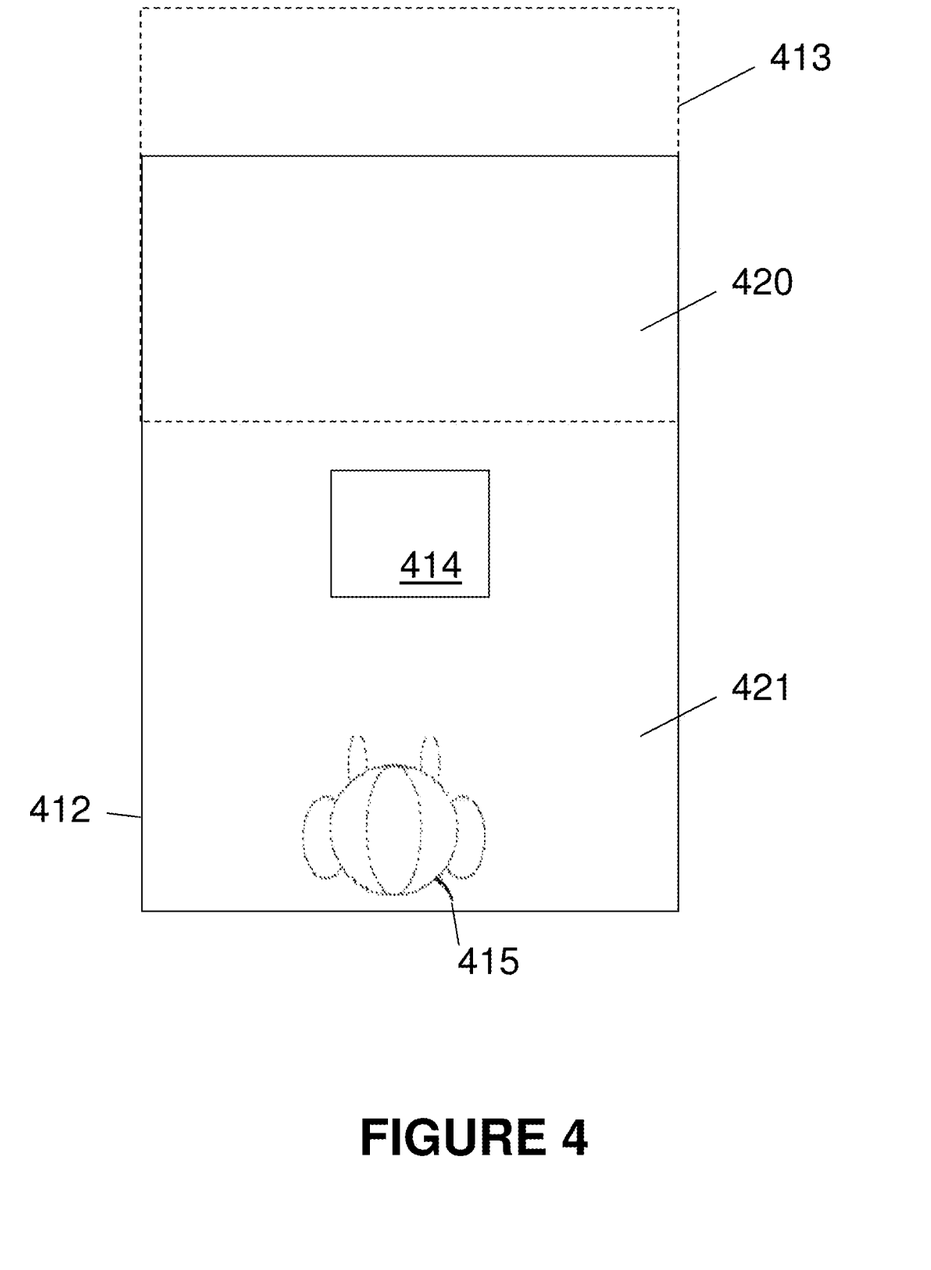
FIG. 4 schematically illustrates a representative area, according to an embodiment of the invention.

In one embodiment which is schematically illustrated in FIG. 4, an image 412 obtained by an image sensor 414 may have an area of overlap, or a representative area 420 overlapping with a virtual image 413 which is the image perceived by a human occupant 415.

In one embodiment a method may include detecting in an image 412 obtained by an image sensor a representative area 420 which represents at least part of a virtual image 413 perceived by a human in the space. Pixels that are located in areas in the image that are not in the representative area (e.g., in area 421) may be determined to be non-representative pixels or may be given a low weight. Thus pixels in a pre-specified location (e.g., area 421 (in image 412) that is not in the representative area 420) may be disregarded or given a low weight when calculating ambient light in the space based on the pixels in the image 412.

In some embodiments the method includes identifying an object in the image and the pre-specified location is a location relative to the identified object. The object may be a primary light source such as a light bulb or an object having a reflective surface such as a mirror, table, white board, glass framed picture, walls or floor. In some cases the object may be an occupant in the space.

Figure 5:
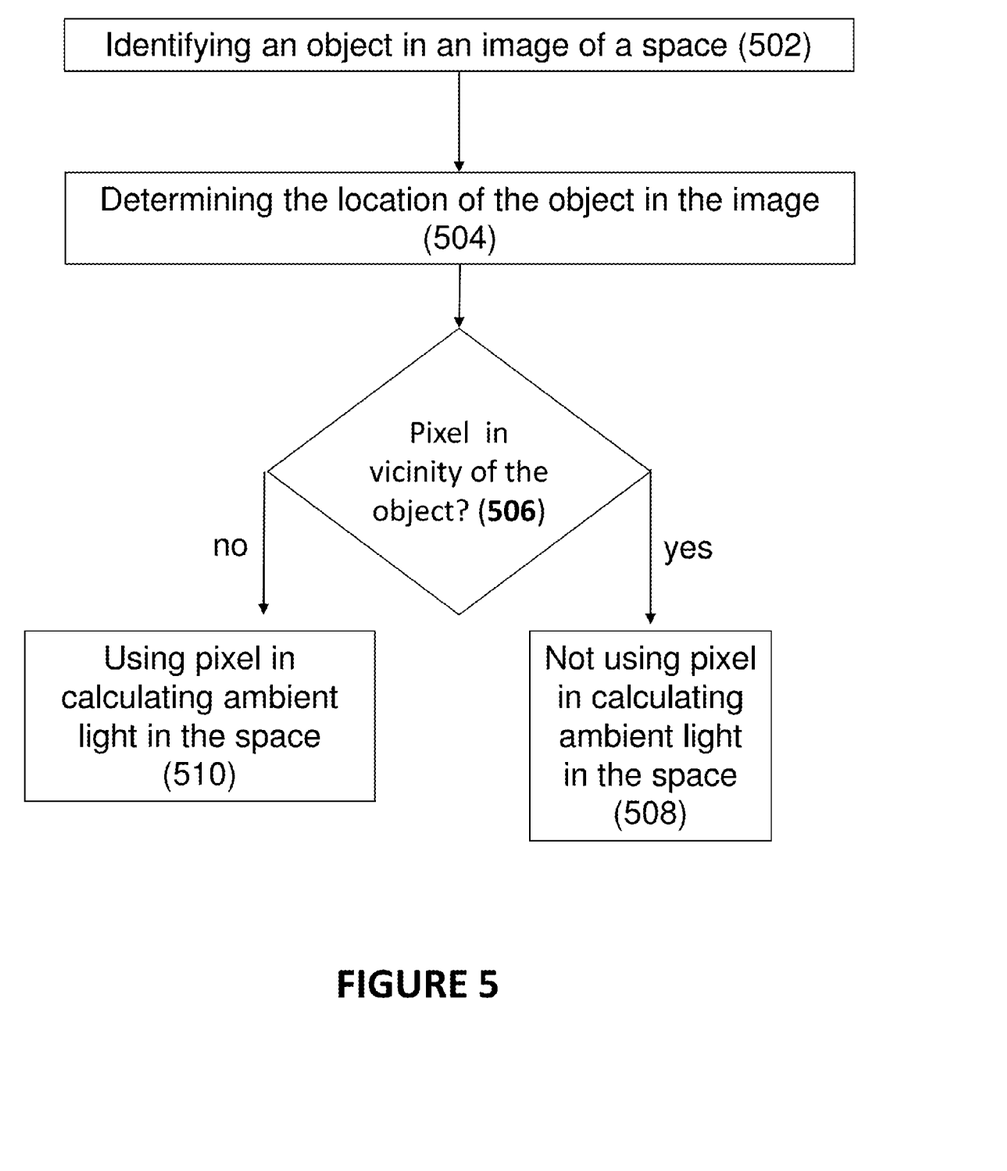
FIG. 5 schematically illustrates a method for calculating ambient light in a space based on detection of an object in an image, according to embodiments of the invention.

In one embodiment which is schematically illustrated in FIG. 5, an object is identified (502) and the location of the object in the image is determined (504). The pre-specified location may be a location relative to the identified object. For example, pixels at the location of or in the vicinity of the object (506) in the image may be determined to be non-representative pixels and may be disregarded or given a low weight when calculating ambient light in the space (508) whereas pixels not in the vicinity of the object (506) are used to calculate ambient light in the space (510) or are given a high weight when calculating ambient light in the space based on the pixels of the image.

Identifying an object in the image may include detecting a shape of the object and/or detecting a texture of the object and/or using other appropriate computer vision techniques to identify an object.

Figure 6:
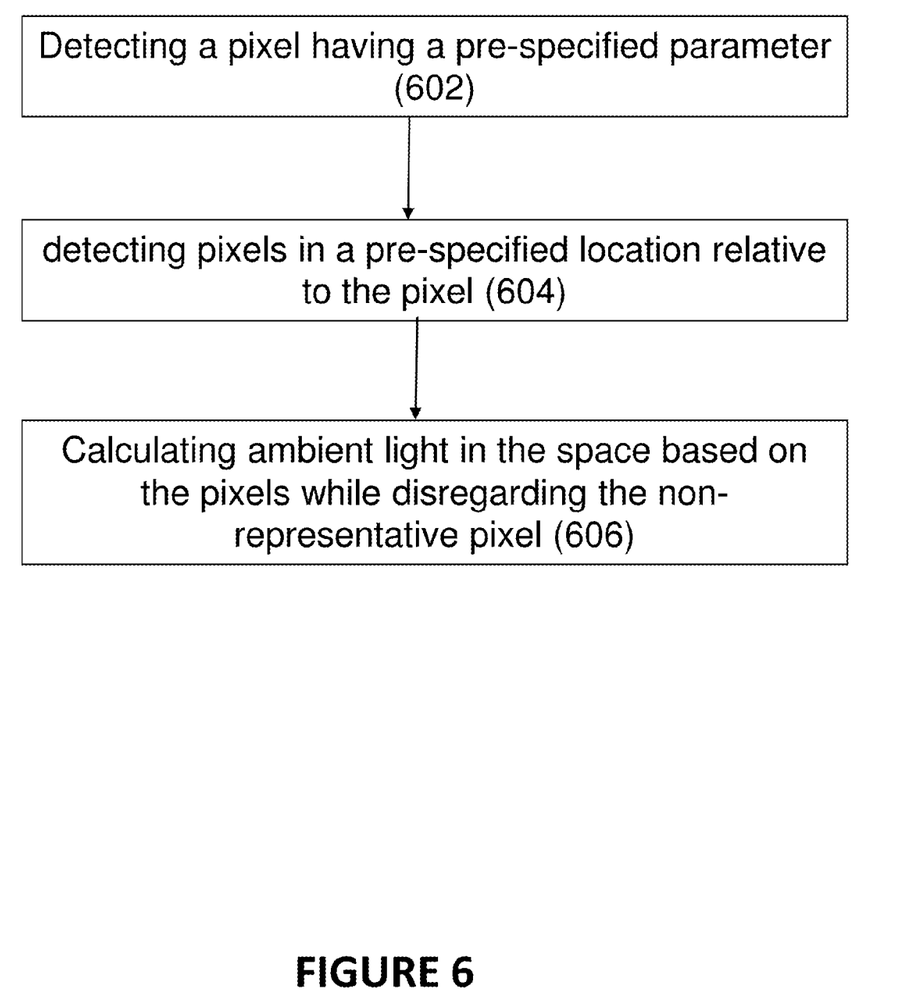
FIG. 6 schematically illustrates a method for calculating ambient light in a space based on location of pixels in an image, according to embodiments of the invention.

In one embodiment, which is schematically illustrated in FIG. 6, the method includes detecting a pixel having a pre-specified parameter (602), for example, as described above. Pixels are then detected in a pre-specified location relative to the pixel (604). The pixels in the pre-specified location relative to the pixel are non-representative pixels and will be disregarded (or will be assigned a low weight) when calculating ambient light in the space based on the pixels in the image (606).

Figure 7:
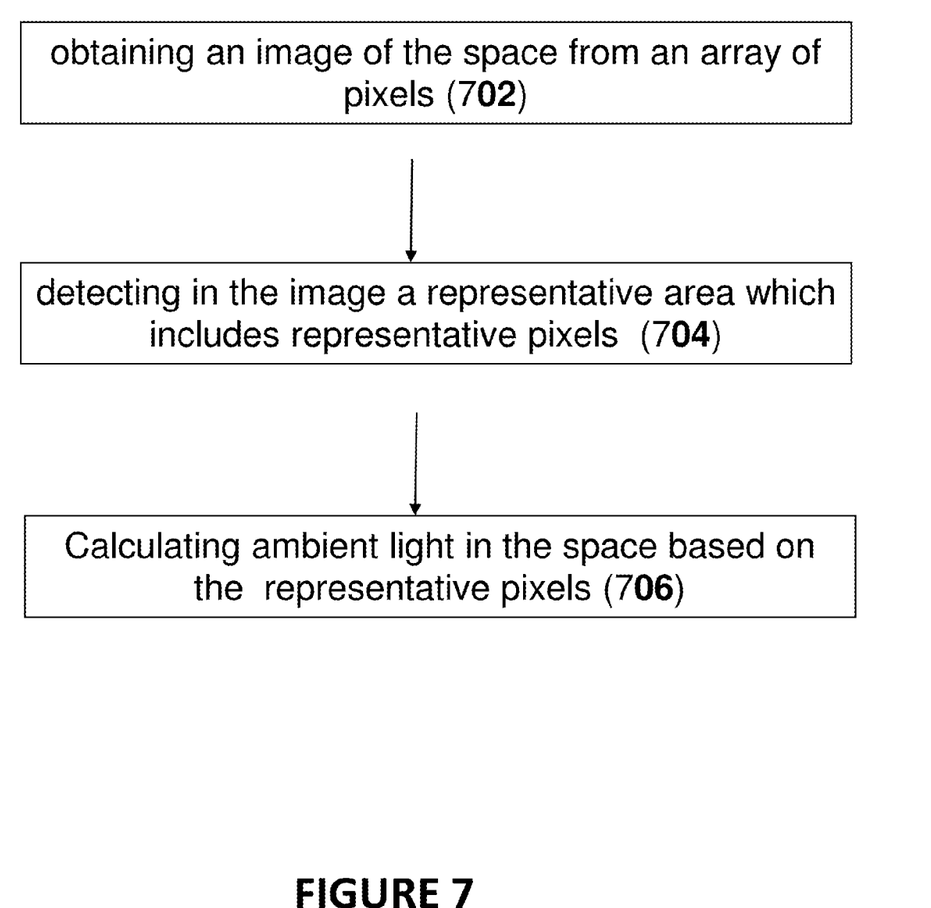
FIG. 7 schematically illustrates a method for calculating ambient light in a space based on detection of a representative area, according to embodiments of the invention.

In one embodiment, which is schematically illustrated in FIG. 7, there is provided a method for calculating ambient light in a space. The method may include obtaining an image or image data of the space from an array of pixels (702). Within the image a representative area is detected (704). The representative area, which includes representative pixels, represents at least part of a virtual image perceived by a human in the space. Ambient light in the space may then be calculated based on a value of the representative pixels (706), e.g., as described above.

The representative area may be detected based on location within the image. For example, if the image is obtained from a top mounted image sensor the image may include, in its' center pixels representing the floor of the space and in its' perimeter pixels representing parts of the walls of the space. A floor may be a reflective surface which may affect the luminance in the image but which affects the virtual image perceived by the human occupant much less. The walls of the space, on the other hand may affect the luminance perceived by the human occupant more than they affect the luminance of the image by the image sensor. Thus, parts of the location within the image (typically a representative area) may include a perimeter of the image.

In one embodiment the representative area is detected based on location within the image (e.g., the perimeter of the image may be determined to include a representative area) and based on detection of a pre-defined object. For example, detection of a pre-defined object such as a window or picture on the wall or the wall itself may be calculated in to the consideration of which pixels to use when calculating ambient light in a space based on image data of the space or how to assign weights to the different pixels.

In one embodiment the method may include obtaining an image of the space from an array of pixels; detecting a parameter of a pixel or group of pixels (e.g., a parameter may be a value of the pixel and/or a location of the pixel); assigning a weight to a value of the pixel or group of pixels in the image based on the parameter of the pixel or group of pixels; and calculating ambient light in the space based on the weighted values of pixels in the image.

Figure 8:
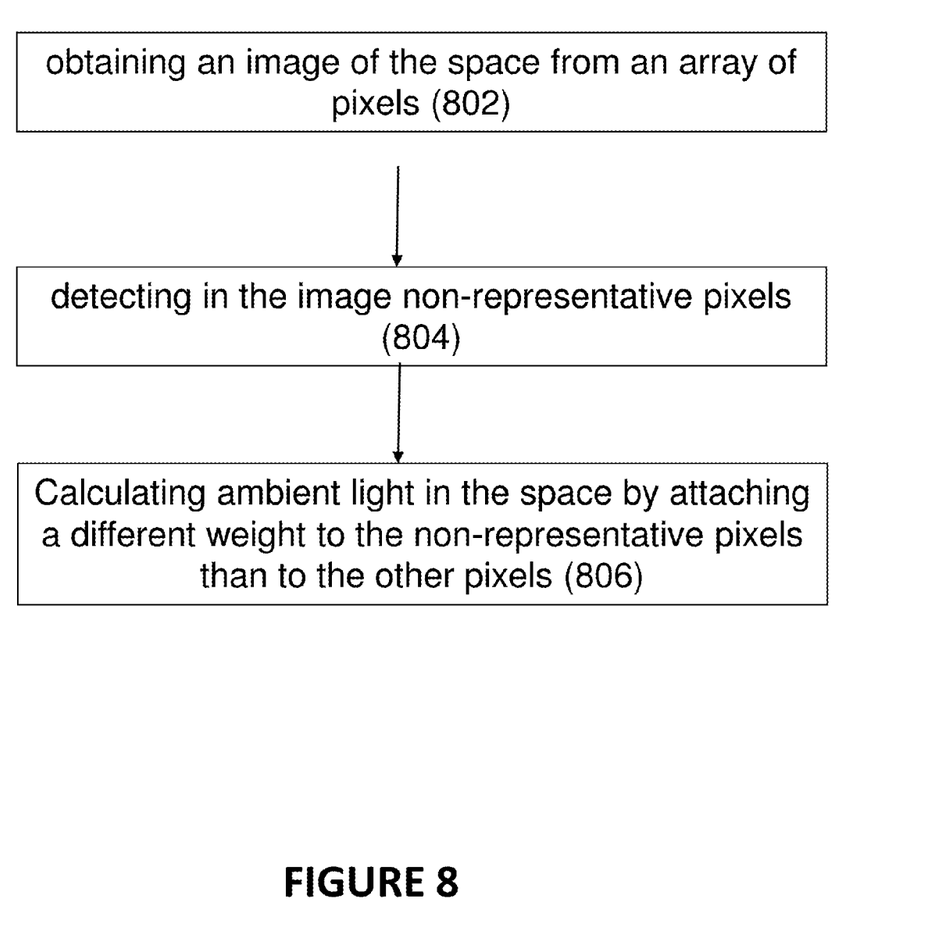
FIG. 8 schematically illustrates a method for calculating ambient light in a space based on weighted pixels, according to embodiments of the invention.

An example of this embodiment is schematically illustrated in FIG. 8. In this example the method includes obtaining an image or image data of the space from an array of pixels (802). The method further includes detecting within the image non-representative pixels, for example, as described above (804) and calculating ambient light in the space by attaching a different weight to the non-representative pixels than to the other pixels in the image (806). Thus, for example, non-representative pixels may be assigned a low weight whereas other pixels in the image (e.g., representative pixels) may be assigned a high weight. The weighted pixel values may be then used to calculate ambient light in a space based on image data of the space, providing an accurate mapping of illumination levels in the space.

Figure 9:
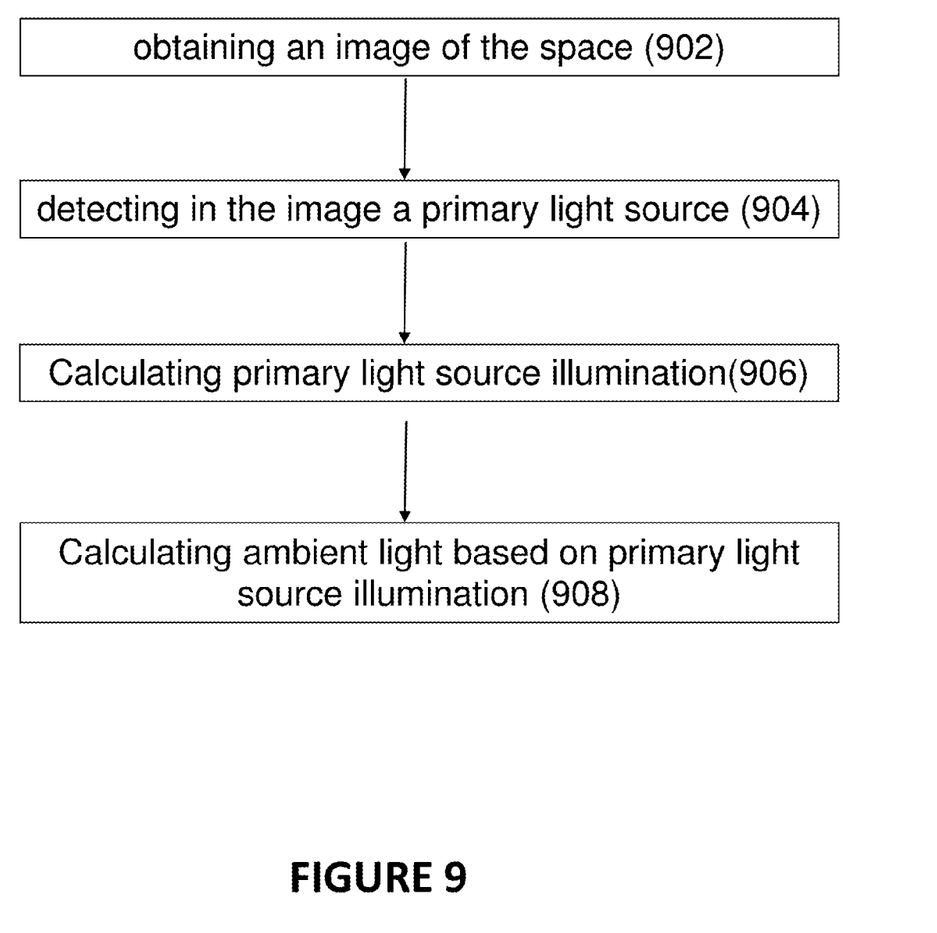
FIG. 9 schematically illustrates a method for calculating ambient light in a space based on estimated primary light source illumination, according to an embodiment of the invention.

In another embodiment of the invention which is schematically illustrated in FIG. 9, ambient light in a space is calculated based on estimated primary light source illumination. The method may include obtaining an image of a space (902). A primary light source (e.g., sunlight through a window, lamps, light bulbs, etc.) may be detected in the image (904). For example, a primary light source may be detected in the image by applying shape detection algorithms on the image to detect the shape of the primary light source. A primary light source may be detected based on detection of pixel values above a predetermined threshold or based on the location of the light source in the image (as described above). Other methods may be used to detect the primary light source in the image.

From the detected primary light source the primary light source illumination may be calculated (906), e.g., by using known functions to determine scene luminance from image brightness using the pixels representing the primary light source.

Ambient light may then be calculated based on the calculated illumination of the primary light source (908). For example, the calculation of ambient light may be an estimation of ambient light based a predetermined function of the primary light source illumination.

Methods of calculating ambient light according to embodiments of the invention may be used for determining current status of light in a space and/or for detecting changes in light conditions in a space (for example by comparing several current statuses over time).

What is claimed is:

1. A method for calculating ambient light in a space, the method comprising:
    obtaining a top view image of the space from an array of pixels;
    defining a plurality of pixel groups in the image;
    determining a representative parameter for each of the pixel groups;
    assigning a weight to each representative parameter;
    calculating ambient light in the space based on the weighted parameters; and
    modulating ambient light in the space based on the calculated ambient light.

2. The method of claim 1 comprising outputting a signal, the signal indicative of the calculated ambient light.

3. The method of claim 1 comprising controlling a building automation device based on the calculated ambient light.

4. The method of claim 1 wherein the representative parameter comprises a location of the group of pixels within the image.

5. The method of claim 4 wherein the location of the group of pixels in the image is a pre-specified location within the image.

6. The method of claim 4 comprising identifying an object in the image and wherein the location is at a pre-specified location relative to the identified object.

7. The method of claim 6 wherein identifying an object in the image comprises detecting a shape of the object.

8. The method of claim 6 wherein identifying an object in the image comprises detecting a texture of the object.

9. The method of claim 6 wherein the object comprises a reflecting surface.

10. The method of claim 6 wherein the object comprises an occupant.

11. The method of claim 1 wherein the representative parameter comprises a value of pixels in the group of pixels.

12. The method of claim 11 comprising:
    calculating a representative pixel value for each of the pixel groups; and
    assigning a low weight to the pixel groups having the highest and lowest representative pixel values.

13. A method for calculating ambient light in a space, the method comprising:
    obtaining an image of the space from an image sensor located on a ceiling of the space;
    defining a plurality of pixel groups in the image;
    calculating a representative pixel value for each of the pixel groups; and
    calculating ambient light in the space based on the pixels in the image, disregarding pixels from the pixel groups having the highest and lowest representative pixel values.

14. The method of claim 13 comprising outputting a signal, the signal indicative of the calculated ambient light.

15. The method of claim 13 comprising controlling a building automation device based on the calculated ambient light.

16. The method of claim 15 wherein controlling the building automation device based on the calculated ambient light comprises modulating light level in the space based on the calculated ambient light.

17. The method of claim 13 wherein defining a plurality of pixel groups in the image comprises dividing the image to equally sized tiles, each tile comprising a pixel group.

18. A system comprising:
    an image sensor located on a ceiling of a space to obtain a top view image of the space; and
    a processor in communication with the image sensor, the processor to
        define a plurality of pixel groups in the image,
        calculate a representative pixel value for each of the pixel groups, and
        calculate ambient light in the space based on the pixels in the image, disregarding pixels from the pixel groups having the highest and lowest representative pixel values.

19. The system of claim 18 wherein the processor is to control ambient light in the space.

* * * * *